(12) United States Patent
Hamada et al.

(10) Patent No.: US 6,340,983 B1
(45) Date of Patent: Jan. 22, 2002

(54) MULTI-BEAM IMAGE RECORDING APPARATUS

(75) Inventors: Takatoshi Hamada; Hiroshi Hiraguchi, both of Toyokawa; Masaaki Goto, Toyohashi; Takeshi Satake, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/404,590

(22) Filed: Sep. 24, 1999

(30) Foreign Application Priority Data

Sep. 25, 1998 (JP) ............................................ 10-272308

(51) Int. Cl.⁷ .......................... B41J 2/385; G03G 13/04
(52) U.S. Cl. ........................ 347/131; 347/129; 347/233; 359/204
(58) Field of Search ................................ 347/129, 131, 347/233, 237, 241, 243; 359/204

(56) References Cited

U.S. PATENT DOCUMENTS

| 5,233,367 A | 8/1993 | Curry |
| 5,241,329 A | 8/1993 | Guerin |
| 5,550,668 A * | 8/1996 | Appel et al. ................. 359/204 |
| 5,774,248 A * | 6/1998 | Komatsu ...................... 359/204 |
| 5,936,755 A * | 8/1999 | Inagaki ........................ 359/204 |
| 6,037,963 A * | 3/2000 | Denton et al. ............... 347/233 |

FOREIGN PATENT DOCUMENTS

| JP | 5-176128 | 7/1993 |
| JP | 7-9696 | 1/1995 |
| JP | 9-054262 | 2/1997 |

* cited by examiner

Primary Examiner—Sanda Brase
(74) Attorney, Agent, or Firm—McDermott, Will & Emery

(57) ABSTRACT

A multi-beam image recording apparatus changes a diameter of a laser beam using a beam diameter changing board, an order in which the line data is to be read from the memory unit, a rotational speed of a polygon mirror, and a clock frequency employed when the image data is read in units of pixels, in accordance with the specified resolution. Accordingly, the multi-beam image recording apparatus can switch between the resolutions without changing a distance between the centers of two laser beams emitted from an optical system. The resolution switching can be achieved with high accuracy at low costs.

15 Claims, 10 Drawing Sheets

MULTI-BEAM IMAGE RECORDING APPARATUS

This application is based on application No. 10-272308 filed in Japan, the content of which is hereby incorporated by reference.

BACKGROUND OF THE INVENTION

(1) Field of the Invention

The present invention relates to a multi-beam image recording apparatus which records an image by scanning optical beams, and particularly relates to a multi-beam image recording apparatus that can switch between different resolutions.

(2) Description of Related Art

There have been laser-beam printers employing the electrophotographic method that can switch between different resolutions.

Examples of such a technique for switching between the resolutions are disclosed in Japanese Laid-Open Patent Applications No. 09-54262 and No. 07-9696 and U.S. Pat. No. 5,241,329. Each of these references relates to a so-called "multi-beam apparatus" which scans beams on a surface of a photosensitive drum.

The invention disclosed in Japanese Laid-Open Patent Application No. 09-54262 relates to an apparatus that scans two beams on the surface of the photosensitive drum. In this apparatus, the resolution is switched by changing a distance between the centers of the two beams emitted for scanning, the distance being measured in the sub-scanning direction. This distance is changed by rotating a dove prism disposed on the way of light paths of the two beams or by switching between a plurality of cylinder lenses each having a different focal length.

The invention disclosed in Japanese Laid-Open Patent No. 07-9696 also relates to an apparatus that scans two beams on the surface of the photosensitive drum. In this apparatus, a distance between the centers of the two beams is changed by adjusting an emitting position of one of the two beams in fine increments.

The invention disclosed in U.S. Pat. No. 5,241,329 relates to an apparatus that forms one pixel of image using a plurality of beams aligned in the sub-scanning direction. In this apparatus, the resolution is switched by changing the number of beams to be used for forming one pixel of image. For example, suppose that one pixel of image is formed using three beams now. When the number of beams (three in this case) to be used for forming one pixel of image is reduced to one and the scanning speed is increased three times faster, the pitch can be reduced to one-third. As a result, the resolution can be increased three times higher.

However, each of the apparatuses disclosed in these references needs a special construction for switching the resolution. For the apparatus of the cited Japanese Laid-Open Patent Application No. 09-54262, a rotateable dove prism or a device for switching between the cylinder lenses is required. When the dove prism is used, high precision is required for a driving device that rotates the dove prism. Such a special construction leads to high manufacturing costs.

Also, the apparatus of Japanese Laid-Open Patent No. 07-9696 needs a device for adjusting the emitting position of the beam, and considerably high precision is required for such a device.

Meanwhile, the apparatus of U.S. Pat. No. 5,241,329 needs a plurality of light sources corresponding to the number of resolutions that can be selected. This apparatus employs the method of forming one pixel of image using a plurality of beams. Thus, when forming an image at the lowest resolution, the use efficiency of the light sources is decreased. This is because only one line can be scanned at one scanning operation even though the plurality of light sources are provided.

SUMMARY OF THE INVENTION

The first object of the present invention is to provide a multi-beam image recording apparatus which can switch between resolutions without having to include a special construction requiring high accuracy for adjustments or a large number of laser sources.

The second object of the present invention is to provide a multi-beam image recording method by which the resolutions can be switched without a special construction requiring high accuracy for adjustments or a large number of laser sources.

The first object of the present invention can be achieved by an image recording apparatus which records an image by scanning a plurality of optical beams across an image carrier, the image recording apparatus made up of: a storing unit which holds image data to be recorded, as a plurality of sets of line data; a receiving unit which receives resolution data that indicates a resolution of the image data to be recorded; a reading unit which reads sets of line data from the storing unit, the sets of line data being determined according to the received resolution data; a plurality of light emitters which respectively emit optical beams, each optical beam being modulated with a different set of line data read by the reading unit; a main-direction scanning unit which simultaneously scans the optical beams in a main scanning direction, the optical beams being separated from each other on a surface of the image carrier in a sub-scanning direction that is perpendicular to the main scanning direction; a diameter changing unit which changes, in accordance with the resolution data, a diameter of a spot formed by each optical beam on the surface of the image carrier, without changing a distance between the optical beams; and a pitch changing unit which changes, in accordance with the resolution data, a pitch between main-scanning lines on the image carrier in the sub-scanning direction, each main-scanning line being a path of an optical beam that is scanned on the image carrier in the main scanning direction by the main-direction scanning unit.

With this construction, the specified resolution can be realized by changing the diameter of the spot and the pitch as well as determining the sets of line data to be used for modulating the optical beams according to the resolution data. Accordingly, the resolutions can be switched at low costs without reducing the image quality.

The first object of the present invention can be also achieved by an image recording apparatus which records an image by scanning a plurality of optical beams across an image carrier, the image recording apparatus made up of: a storing unit which holds image data to be recorded, as a plurality of sets of line data; a receiving unit which receives resolution data that indicates a resolution of the image data to be recorded; a reading unit which reads sets of line data from the storing unit; a plurality of light emitters which respectively emit optical beams, each optical beam being modulated with a different set of line data read by the reading unit; a main-direction scanning unit which simultaneously scans the optical beams in a main scanning direction, the optical beams being separated from each other on a surface of the image carrier in a sub-scanning direction that is perpendicular to the main scanning direction; and a diameter changing unit which changes, in accordance with the resolution data, a diameter of a spot formed by each optical beam on the surface of the image carrier, without changing a distance between the optical beams.

The first object of the present invention can be also achieved by an image recording apparatus which records an image by scanning a plurality of optical beams across an image carrier, the image recording apparatus made up of: a storing unit which holds image data to be recorded, as a plurality of sets of line data; a receiving unit which receives resolution data that indicates a resolution of the image data to be recorded; a reading unit which reads sets of line data from the storing unit; a plurality of light emitters which respectively emit optical beams, each optical beam being modulated with a different set of line data read by the reading unit; a main-direction scanning unit which simultaneously scans the optical beams in a main scanning direction, the optical beams being separated from each other on a surface of the image carrier in a sub-scanning direction that is perpendicular to the main scanning direction; and a pitch changing unit which changes, in accordance with the resolution data, a pitch between main-scanning lines on the image carrier in the sub-scanning direction, each main-scanning line being a path of an optical beam that is scanned on the image carrier in the main scanning direction by the main-direction scanning unit.

The first object of the present invention can be also achieved by an image recording apparatus which records an image by scanning a plurality of optical beams across an image carrier, the image recording apparatus made up of: a storing unit which holds image data to be recorded, as a plurality of sets of line data; a receiving unit which receives resolution data that indicates a resolution of the image data to be recorded; a reading unit which reads sets of line data from the storing unit, the sets of line data being determined according to the received resolution data; a plurality of light emitters which respectively emit optical beams, each optical beam being modulated with a different set of line data read by the reading unit; and a main-direction scanning unit which simultaneously scans the optical beams in a main scanning direction, the optical beams being separated from each other on a surface of the image carrier in a sub-scanning direction that is perpendicular to the main scanning direction.

The second object of the present invention can be achieved by an image recording method of recording an image by scanning a plurality of optical beams across an image carrier, the image recording method including: a step of storing image data to be recorded, as a plurality of sets of line data; a step of receiving resolution data that indicates a resolution of the image data to be recorded; a step of reading sets of line data from the storing unit, the sets of line data being determined according to the received resolution data; a step of emitting a plurality of optical beams, each optical beam being modulated with a different set of line data read in the reading step; a step of changing, in accordance with the resolution data, a diameter of a spot formed by each optical beam on the surface of the image carrier, without changing a distance between the optical beams; a step of simultaneously scanning the optical beams in a main scanning direction, the optical beams being separated from each other on a surface of the image carrier in a sub-scanning direction that is perpendicular to the main scanning direction; and a step of changing, in accordance with the resolution data, a pitch between main-scanning lines on the image carrier in the sub-scanning direction, each main-scanning line being a path of an optical beam that is scanned on the image carrier in the main scanning direction by the scanning step.

The second object of the present invention can be also achieved by an image recording method of recording an image by scanning a plurality of optical beams across an image carrier, the image recording method including: a step of storing image data to be recorded, as a plurality of sets of line data; a step of receiving resolution data that indicates a resolution of the image data to be recorded; a step of reading sets of line data from the storing unit; a step of emitting a plurality of optical beams, each optical beam being modulated with a different set of line data read in the reading step; a step of changing, in accordance with the resolution data, a diameter of a spot formed by each optical beam on the surface of the image carrier, without changing a distance between the optical beams; and a step of simultaneously scanning the optical beams in a main scanning direction, the optical beams being separated from each other on a surface of the image carrier in a sub-scanning direction that is perpendicular to the main scanning direction.

The second object of the present invention can be also achieved by an image recording method of recording an image by scanning a plurality of optical beams across an image carrier, the image recording method including: a step of storing image data to be recorded, as a plurality of sets of line data; a step of receiving resolution data that indicates a resolution of the image data to be recorded; a step of reading sets of line data from the storing unit; a step of emitting a plurality of optical beams, each optical beam being modulated with a different set of line data read in the reading step; a step of simultaneously scanning the optical beams in a main scanning direction, the optical beams being separated from each other on a surface of the image carrier in a sub-scanning direction that is perpendicular to the main scanning direction; a step of changing, in accordance with the resolution data, a pitch between main-scanning lines on the image carrier in the sub-scanning direction, each main-scanning line being a path of an optical beam that is scanned on the image carrier in the main scanning direction by the scanning step.

The second object of the present invention can be also achieved by an image recording method of recording an image by scanning a plurality of optical beams across an image carrier, the image recording method including: a step of storing image data to be recorded, as a plurality of sets of line data; a step of receiving resolution data that indicates a resolution of the image data to be recorded; a step of reading sets of line data from the storing unit, the sets of line data being determined according to the received resolution data; a step of emitting a plurality of optical beams, each optical beam being modulated with a different set of line data read in the reading step; and a step of simultaneously scanning the optical beams in a main scanning direction, the optical beams being separated from each other on a surface of the image carrier in a sub-scanning direction that is perpendicular to the main scanning direction.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following is a description of an embodiment of a multi-beam image recording apparatus of the present invention. In the embodiment, a digital copier (referred to as the "copier 1" hereinafter) is used as an example of such a multi-beam image recording apparatus.

Overall Construction of the Copier 1

Figure 1:
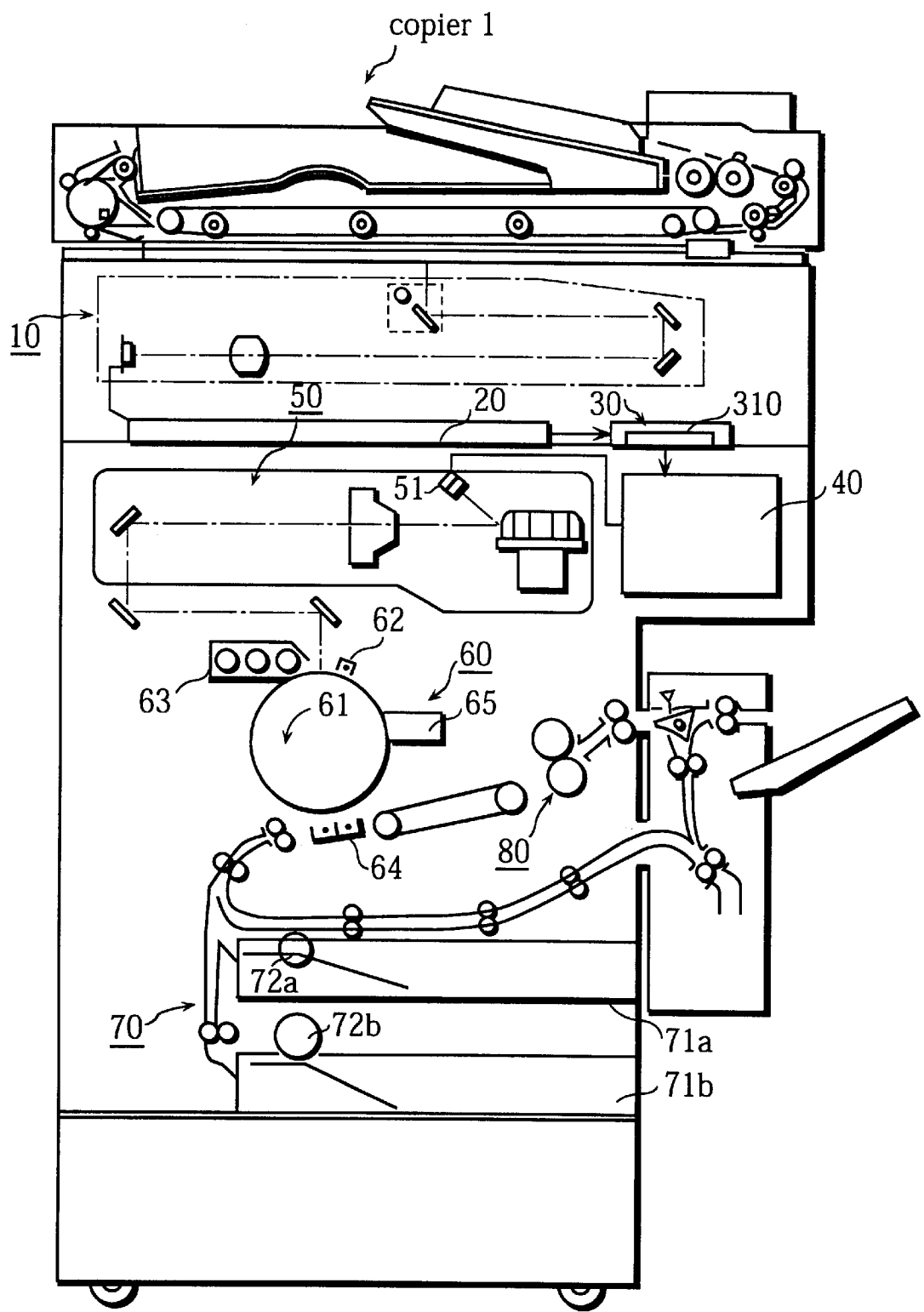
FIG. 1 is a cross-sectional view showing the construction of a copier of an embodiment of the present invention.

FIG. 1 is a cross-sectional view showing the construction of the copier 1.

The copier 1 is composed of an image reading unit 10, an image signal processing unit 20, a memory unit 30, a control unit 40, an optical system 50, an image forming system 60, a paper feeding unit 70, and a fixing unit 80.

The image reading unit 10 reads an original with a degree of precision corresponding to the specified resolution. Then, the image reading unit 10 converts the read image data into electric signals and transmits the electric signals as the image data to the image signal processing unit 20.

The image signal processing unit 20 performs correction processes on the image data transmitted from the image reading unit 10 so that the original image is faithfully reproduced. After the correction processes, the image signal processing unit 20 outputs the image data to the memory unit 30.

The memory unit 30 stores the image data into an image data memory 310. The memory unit 30 divides the image data in units of lines and stores the image data for each line into the image data memory 310. Each line is assigned a unique number as a line address. Hereinafter, image data corresponding to a line may be referred to as the "line data."

When receiving an instruction from a control unit 40 to output the image data, the memory unit 30 outputs two lines of the image data to the control unit 40 at a speed corresponding to the currently specified resolution. In this way, two lines are respectively scanned on a photosensitive drum 61 by two laser beams simultaneously, in accordance with the line data. In the present embodiment, this process is regarded as "one scanning process."

The control unit 40 receives instructions, such as the number of copiers to make and the resolution switching, from a user through an operation panel (not shown). In accordance with the instructions, the control unit 40 controls timings at which components provided in the copier 1 perform the respective operations so that a smooth copying operation is realized.

Figure 2:
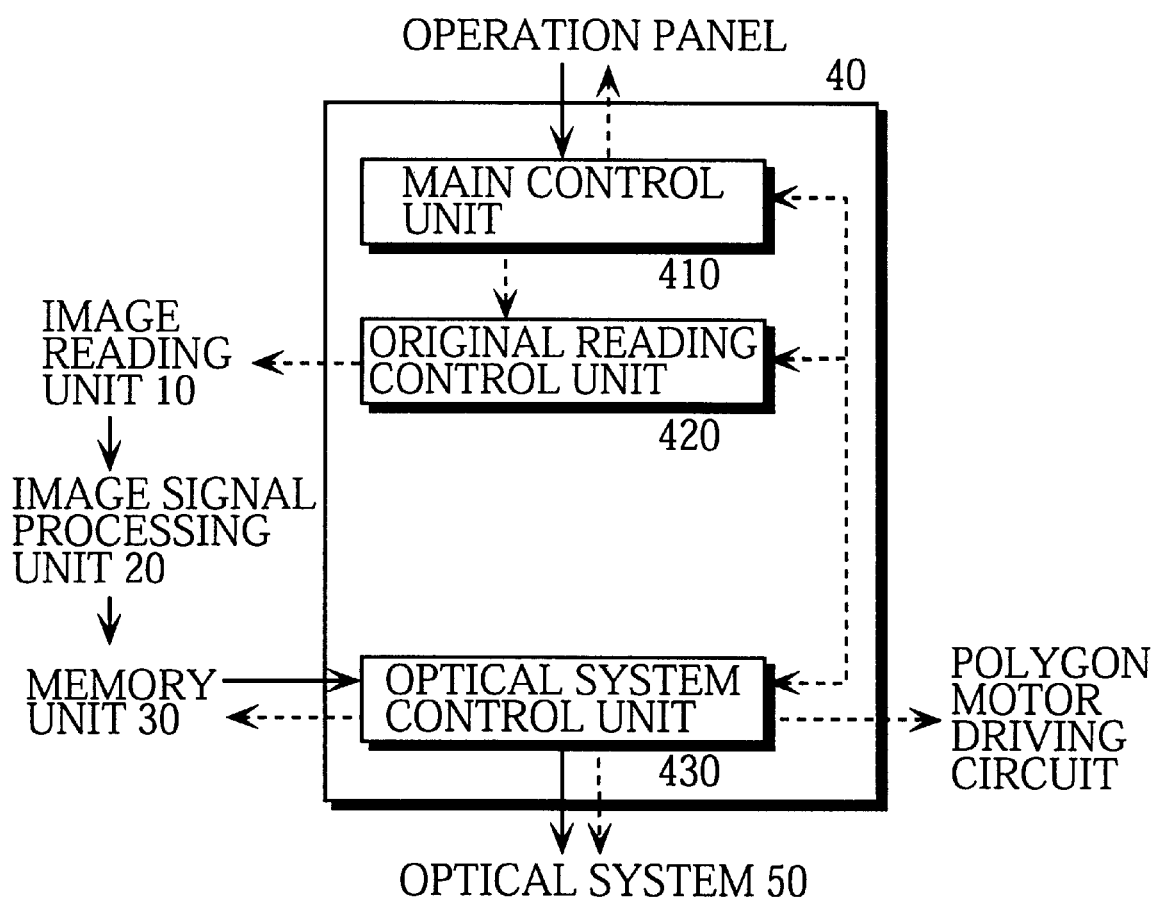
FIG. 2 is a block diagram showing the structure of a control unit of the copier.

FIG. 2 is a block diagram showing the structure of the control unit 40. The control unit 40 includes a main control unit 410 as the main unit, an original reading control unit 420, and an optical system control unit 430. The original reading control unit 420 controls the image reading unit 10. The optical system control unit 430 controls the operation performed by the optical system 50 for image formation. Each of these units has a CPU, a ROM, and a RAM, the CPU serving as the main component. As shown in FIG. 2, data and commands are sent/received via command lines drawn in dotted lines, and image data is sent/received via image data buses drawn in solid lines.

The optical system control unit 430 converts the image data transmitted from the memory unit 30 into a laser diode (LD) driving signal which it transmits to the optical system 50. Then, the optical system 50 has the two laser beams emitted so as to expose the surface of the photosensitive drum 61. Here, the optical system control unit 430 controls a timing to output the driving signal so that scanning start positions of the laser beams for a scanning process are aligned on the photosensitive drum 61 in the main scanning direction. The optical system control unit 430 also controls the scanning processes in accordance with the currently specified resolution. This scanning process control performed by the optical system control unit 430 is described in detail later in this specification.

The main control unit 410 controls operations performed by the units of the control unit 40, thereby achieving a smooth copying operation.

The optical system 50 emits the two laser beams which have been modulated with the image data transmitted from the memory unit 30 via the control unit 40, and has the surface of the photosensitive drum 61 exposed by the laser beams. As a result, an electrostatic latent image is formed on the surface of the photosensitive drum 61.

Figure 3:
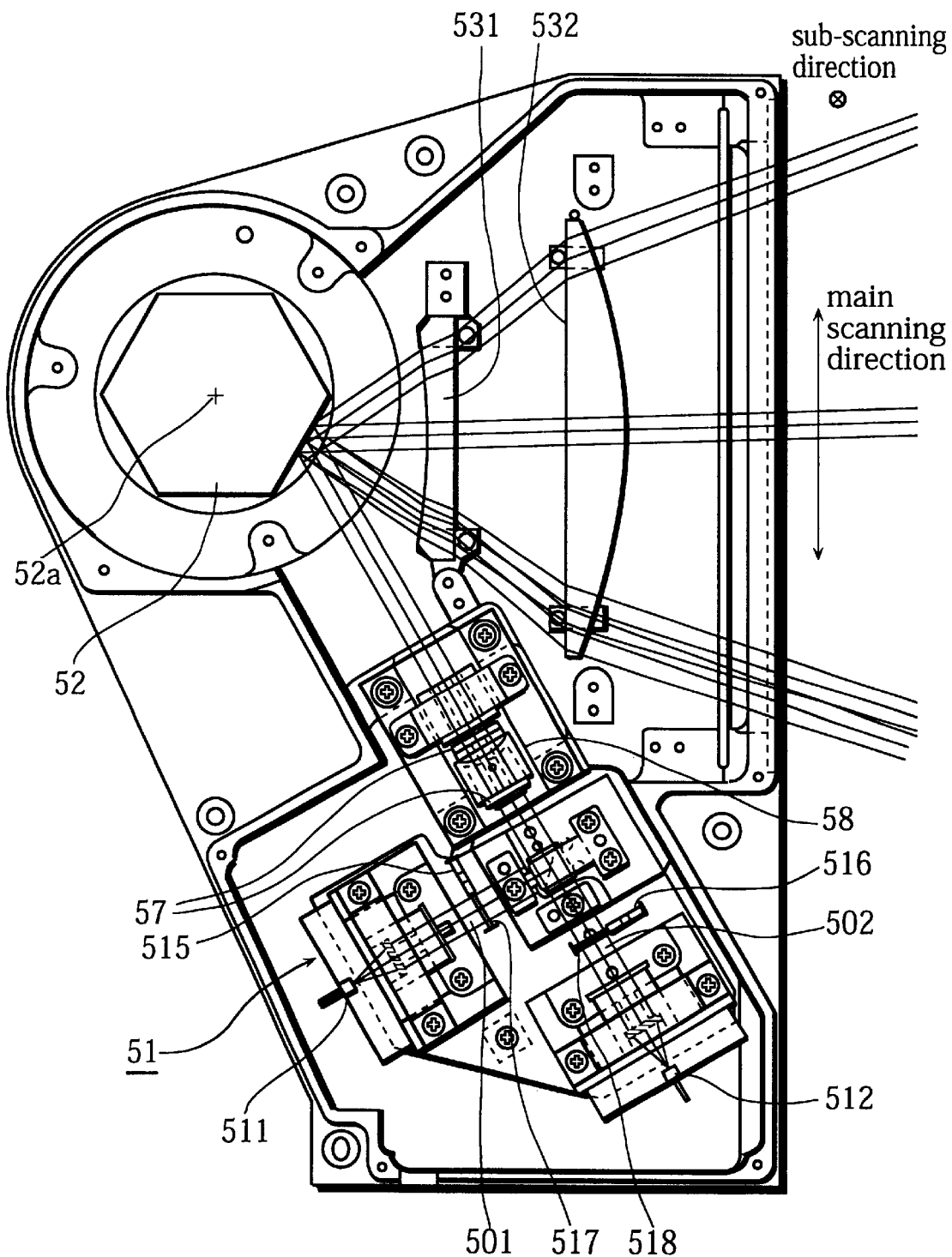
FIG. 3 shows the construction of an optical system provided in the copier.

FIG. 3 shows the construction of the optical system 50. The optical system 50 includes a light source device 51, a polygon mirror 52, scanning lenses 531 and 532, a pair of cylindrical lenses 57, and a lens-barrel 58. The light source device 51 has first and second laser diodes (LDs) 511 and 512.

The light source device 51 has two laser beams 501 and 502 respectively emitted from the first and second LDs 511 and 512 to the pair of cylindrical lenses 57. In doing so, the light source device 51 has to satisfy the following conditions: ① starting positions of the laser beams 501 and 502 are aligned in the main scanning direction; and ② the laser beams 501 and 502 are almost parallel to each other on the photosensitive drum 61 with a constant space left in between in the sub-scanning direction. In accordance with the currently specified resolution, the light source device 51 changes widths of the laser beams 501 and 502 (the widths may be referred to as the "laser diameters" hereinafter). The method of changing the laser diameters that the light source device 51 employs is described in detail later in this specification.

The laser beams 501 and 502 are converged in the sub-scanning direction by the pair of cylindrical lenses 57 held in the lens-barrel 58. The laser beams 501 and 502 are then incident upon a facet of the polygon mirror 52. The pair of cylindrical lenses 57 converges the laser beams 501 and 502, so that a problem where the laser beams 501 and 502 are emitted in an incorrect direction due to a tilt of the polygon mirror is avoided.

The polygon mirror 52 has a rotational shaft 52a and is rotated by a polygon motor (not shown). The laser beams 501 and 502 are deflected by the polygon mirror 52 in the main scanning direction. The rotational speed of the polygon mirror 52 is changed in accordance with the specified resolution. For doing so, the control unit 40 controls a polygon motor driving circuit (not shown) using a polygon motor control signal. The process performed by the control unit 40 for controlling the rotational speed of the polygon mirror is described later in this specification.

By means of the scanning lenses 531 and 532, the laser beams 501 and 502 deflected by the polygon mirror 52 are incident upon the surface of the photosensitive drum 61.

The image forming system 60 is composed of a sensitizing charger 62, a developing unit 63, a transfer charger 64, and a cleaner 65 which are all provided around the photosensitive drum 61 that is also included in the image forming system 60. The sensitizing charger 62 charges the photosensitive drum 61, which is rotationally driven, to ensure a predetermined surface potential of the photosensitive drum 61. The developing unit 63 develops the electrostatic latent image formed on the surface of the photosensitive drum 61 by the optical system 50 into a toner image. The transfer charger 64 transfers the toner image formed on the photosensitive drum 61 onto a recording sheet. The cleaner 65 removes remaining toner particles from the surface of the photosensitive drum 61 after the toner image has been transferred onto the recording sheet.

The paper feeding unit 70 includes feeding cassettes 71a and 71b, and feeding rollers 72a and 72b. The feeding roller 72a or 72b is rotated to take up one recording sheet at a time from the corresponding feeding cassette 71a or 71b. The recording sheet is then transported to the transfer charger 64.

The fixing unit 80 includes a pair of rollers. The toner image transferred onto the recording sheet is fused and fixed in place by the pair of rollers with heat.

Control of Resolution Switching

In the copier 1 of the present embodiment, the resolution of an image to be formed can be switched between 400 dpi and 1200 dpi. The resolution of 400 dpi is the standard resolution for the copier 1.

Figure 4A:
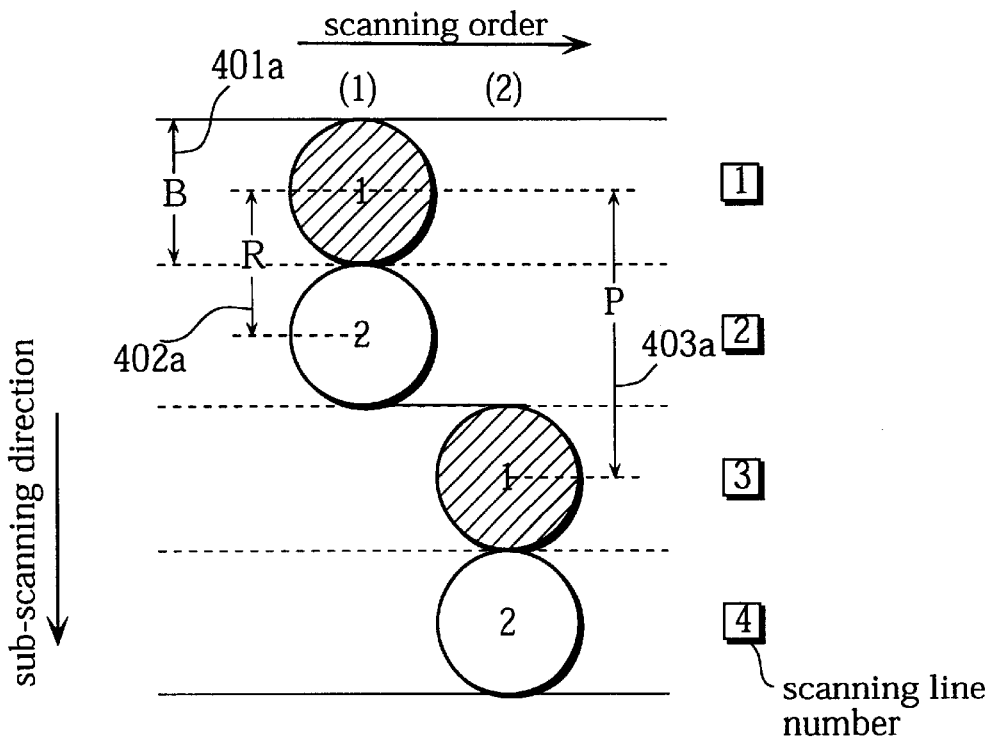
FIG. 4A is a representation to show diameters of the laser beams 501 and 502 and their positional relation when an image is formed at the resolution of 400 dpi.
Figure 4B:
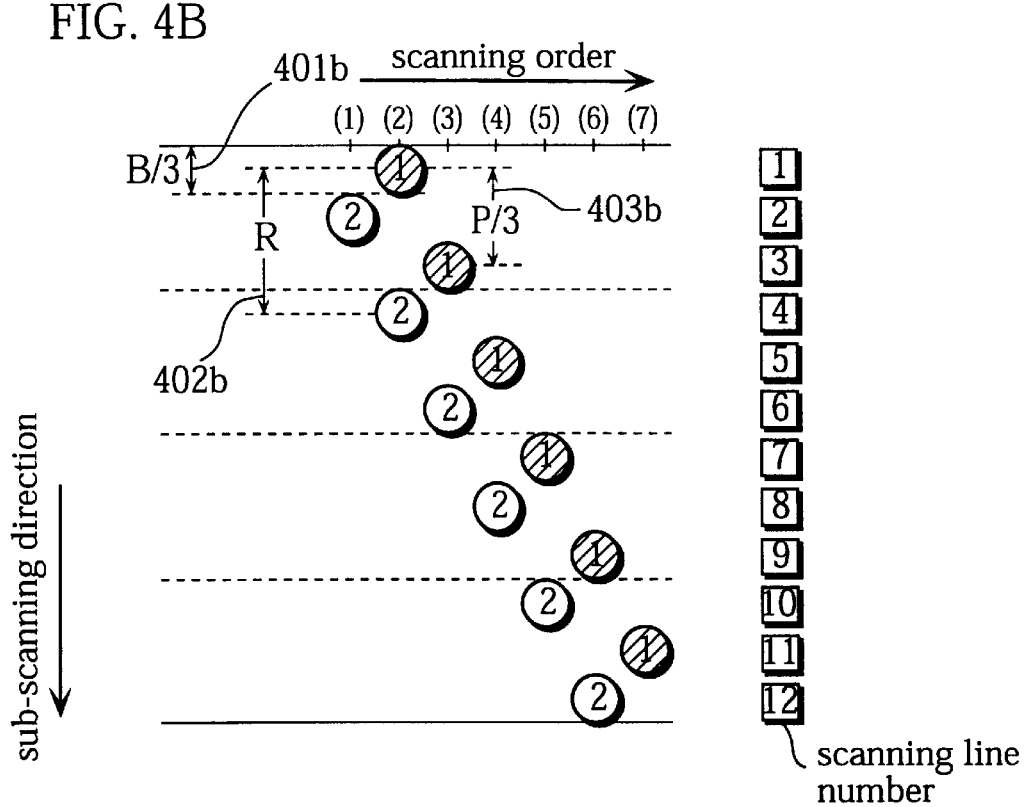
FIG. 4B is a representation to show diameters of the laser beams 501 and 502 and their positional relation when an image is formed at the resolution of 1200 dpi.

FIGS. 4A and 4B are representations to show laser diameters of the laser beams 501 and 502 and their positional relation when an image is formed using the resolutions of 400 dpi and 1200 dpi. For convenience of explanation, the laser beams 501 and 502 are drawn as circles representing beam spots numbered "1" and "2".

It should be noted here that the beam spots used in this specification do not refer to parts where lights are incident but parts that are actually exposed to eventually attract toner particles.

In FIGS. 4A and 4B, numbers in parentheses indicate the order in which scanning processes are performed. Numbers in boxes drawn in the right-hand part of the figures are scanning line numbers that specifically indicate the scanning lines that the laser beams 501 and 502 will respectively scan on the photosensitive drum 61. These scanning line numbers correspond to the line addresses assigned to the line data in the image memory 310.

In order to enhance ease to see the order, in which the scanning processes are performed, the positions of beam spots are not aligned in the main scanning direction on purpose. Therefore, it should be obvious that in actual scanning processes the laser beams emitted based on the pieces of image data having the same address of the main scanning direction are incident upon the surface of the photosensitive drum 61 at the same point in the main scanning direction.

In FIG. 4A, the image is formed at the resolution of 400 dpi. Each diameter of the beam spots (or, the laser diameter) is referred to as 401a, and each distance between the centers of the beam spots is referred to as 402a. Each scanning pitch is referred to as 403a. Here, as indicated by the arrow for 403a, the scanning pitch refers to a distance between the center of a scanning line in a scanning process and the center of the corresponding scanning line in the next scanning process. Suppose that a value of the spot diameter 401a is B, a value of the spot distance 402a is R, and a value of the scanning pitch 403a is P. For convenience of explanation, the value B is set equal to the value R in the present embodiment. This means that two beam spots are adjacent to each other as shown in FIG. 4A. As such, the value P is calculated by doubling the value R.

When the resolution of 400 dpi is specified for image formation, the scanning lines numbered "1" and "2" are scanned in the first scanning process. Then, the scanning lines numbered "3" and "4" are scanned in the second scanning process. The distance between the center of the beam spot 1 or 2 in the first scanning process and the center of the corresponding beam spot 1 or 2 in the second scanning process is P in the sub-scanning direction.

In this way, an odd-numbered scanning line is scanned by the laser beam 501 while an even-numbered scanning line is scanned by the laser beam 502 for each scanning process. Since two scanning lines of image are formed for each scanning process, the image forming speed is doubled as compared with a case where only one scanning line of image is formed for each scanning process.

FIG. 4B is a representation to show diameters of the laser beams 501 and 502 and their positional relation when the resolution is changed from 400 dpi to 1200 dpi.

As shown in FIG. 4B, the value of a spot diameter 401b is reduced to one-third of B. The value of a spot distance 402b is R as in the case of 400 dpi. The value of a scanning pitch 403b is reduced to one-third of P, and it should be obvious that P/3 equals to 2R/3.

The spot diameter is changed using a diameter changing board described later. To reduce the scanning pitch to one-third, the scanning speed of the laser beams in the main scanning direction should be set three times faster. For doing so in turn, the rotational speed of the polygon mirror 52 should be set three times faster.

To achieve the image formation at the tripled speed, the order in which the scanning lines are scanned by the beams needs to be changed due to the fixed R.

The process performed for the resolution of 1200 dpi is specifically explained using an example shown in FIG. 4B. In the first scanning process, no scanning line is scanned by the laser beam 501 and the scanning line numbered "2" is scanned by the laser beam 502. In the second scanning process, the scanning lines numbered "1" and "4" are respectively scanned by the first and second laser beams 501 and 502. Then, in the third scanning process, the scanning lines numbered "3" and "6" that are respectively located at a distance equivalent to P/3 from the scanning lines numbered "1" and "4" are scanned by the laser beams 501 and 502.

In this way, in an $N^{th}$ scanning process (the second scanning process in the above-mentioned example), a scanning line is scanned by the laser beam 502 prior to the immediately preceding scanning line that is to be scanned by the laser beam 501. Then, that skipped scanning line is scanned by the laser beam 501 in an (N+1)$^{th}$ scanning process (the third scanning process in the above-mentioned example) A series of scanning processes performed in such a way as in the case of 1200 dpi is referred to as the "skip scanning" hereinafter.

As explained above, the line data is not read from the memory unit 30 according to the scanning line numbers in order since the scanning lines are not scanned by the laser beams 501 and 502 in the order of the scanning line numbers. Furthermore, both the scanning pitch and the spot diameter are reduced to one-third. Consequently, the resolution of the image is increased three times higher than a case where 400 dpi is specified.

To change the resolution from 400 dpi (shown in FIG. 4A) to 1200 dpi (shown in FIG. 4B), the following three controls need to be performed. They are: control for reducing the spot diameter; control of the scanning order for the skip scanning; and control for increasing the scanning speed, i.e. reducing the pitch to one-third. These three control processes will be separately explained in detail below.

(1) Control of the Spot Diameter

The construction and procedural steps required for reducing the spot diameter are explained. This process is performed by the light source device 51 provided in the optical system 50.

Figure 5:
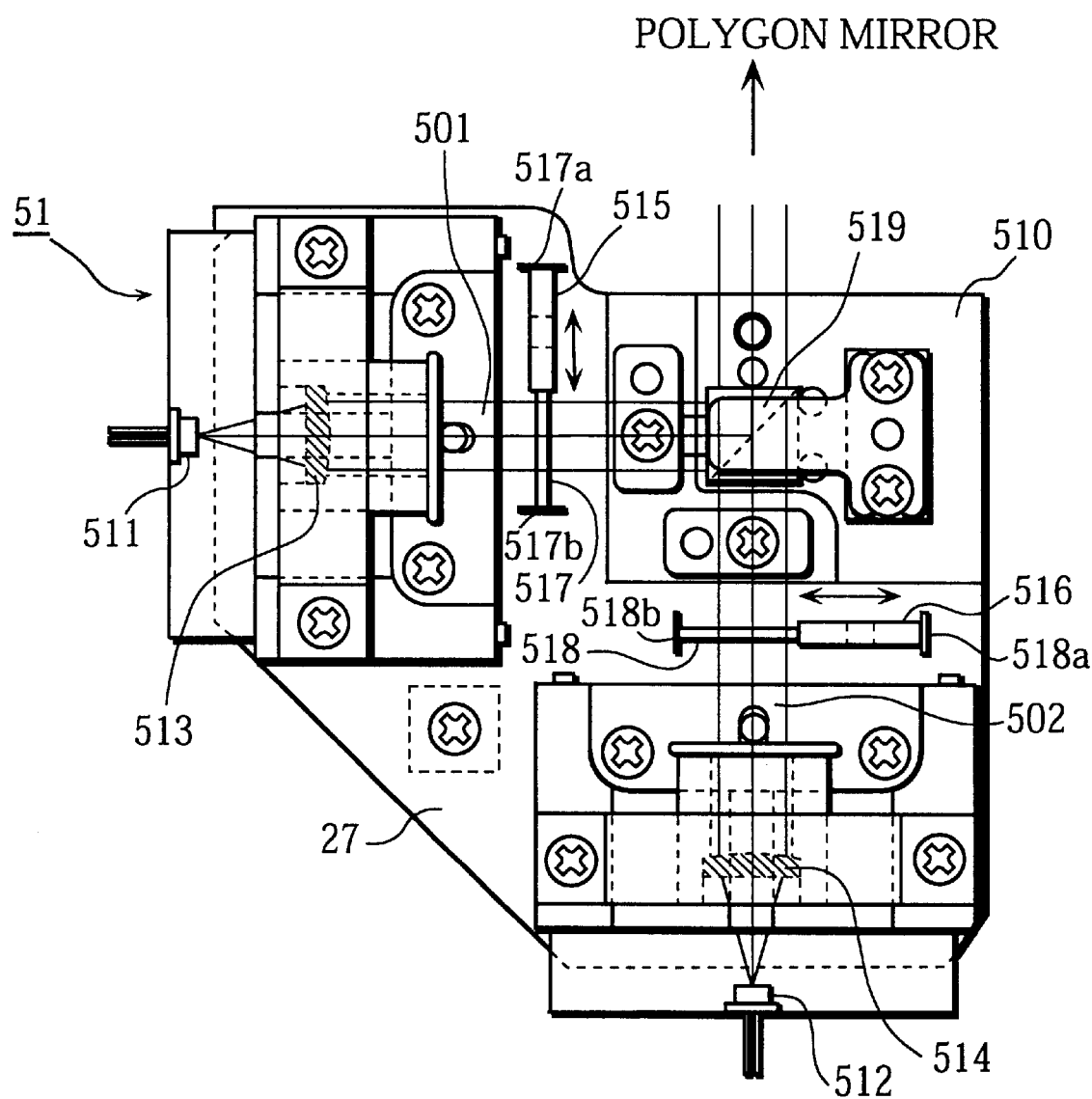
FIG. 5 shows the construction of a light source device provided in the copier.

FIG. 5 is an enlarged view showing the construction of the light source device 51. The light source device 51 is composed of first and second LDs 511 and 512, collimator lenses 513 and 514, diameter changing boards 515 and 516 (simply referred to as the "boards 515 and 516" hereinafter), and a beam splitter 519. They are arranged on a base plate 510 as shown in FIG. 5.

The first and second LDs 511 and 512 emit laser beams in different directions to respectively reach the surface of the photosensitive drum 61. Conditions of the optical elements located on the way to the photosensitive drum 61 from the first and second LDs 511 and 512 are set so that the spot diameters of the laser beams 501 and 502 become B on the photosensitive drum 61. Here, the optical elements are the polygon mirror 52, rotational shaft 52a, scanning lenses 531 and 532, pair of cylindrical lenses 57, and lens-barrel 58.

The diameters of the laser beams 501 and 502 are D immediately after they pass through the collimator lenses 513 and 514. Note that laser beams 501 and 502 are emitted from the respective LDs 511 and 512 in such manners as to keep the distance between optical axes of the laser beams 501 and 502 at R on the surface of the photosensitive drum 61.

The beam splitter 519 reflects the laser beam 501 into a direction perpendicular to the emitting direction of the laser beam 501 while allowing the laser beam 502 pass through the beam splitter 519. As a result, the laser beams 501 and 502 are incident upon the pair of cylindrical lenses 57, with the optical axes being parallel to each other.

The boards 515 and 516 are respectively used for changing the diameters of the laser beams 501 and 502. Specifically, the boards 515 and 516 intercept partial light of the laser beams 501 and 502 before the laser beams 501 and 502 reach the pair of cylindrical lenses 57. As shown in FIG. 5, the boards 515 and 516 are respectively held on rails 517 and 518 in such manners as to be able to shift in respective directions indicated by the arrows. Each of the rails 517 and 518 has stoppers at both ends. The stoppers are indicated as 517a, 517b, 518a, and 518b in FIG. 5. Each board 515 and 516 is shifted between the corresponding stoppers using an actuating mechanism (not shown), such as a solenoid. The shift of the boards 515 and 516 is executed according to a signal transmitted from the optical system control unit 430.

Figure 6:
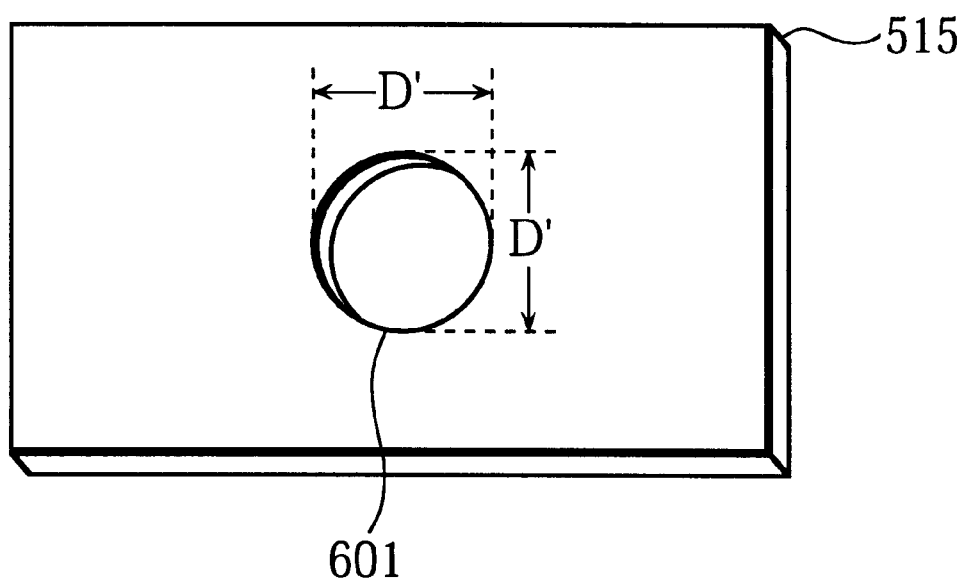
FIG. 6 shows an appearance of a board used for changing a diameter of a laser beam.

FIG. 6 shows an appearance of the board 515. As understood from the above description, the boards 515 and 516 have the same construction, and so the appearance of the board 516 is not shown. As shown in FIG. 6, a hole 601 is set in the almost middle of the board 515, the diameter of the hole 601 being D'. When the board 515 is shifted to come in contact with the stopper 517b, only the partial light of the laser beam 501 that includes the optical axis as the center passes through the hole 601 of the board 515. The size of the hole 601, namely the value of D', is set so that the diameter of the laser beam 501 is equal to one-third of B when the laser beam 501 is incident upon the surface of the photosensitive drum 61.

Figure 7A:
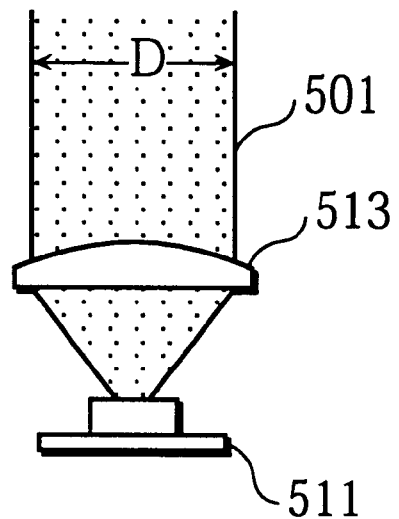
FIGS. 7A and 7B are drawings to help explain how the diameter of a laser beam changed according to a shift of the board that is used for changing the diameter of the beam.
Figure 7B:
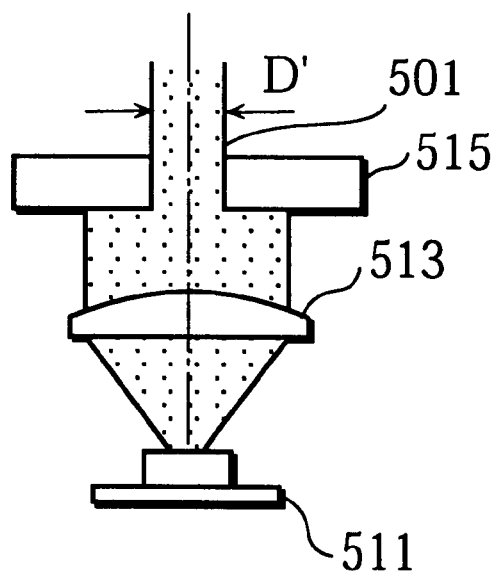

FIGS. 7A and 7B are drawings to help explain how the diameter of the laser beam 501 is changed according to a shift of the board 515. Note that the boards 515 and 516 have the same construction as stated and so the same result can be obtained for the laser beams 501 and 502 after the shift of the corresponding boards 515 and 516. The explanation will be given only for a case where the board 515 is used for changing the diameter of the laser beam 501, and therefore, the explanation for the board 516 is omitted in the present embodiment.

Suppose that the board 515 is now in contact with the stopper 517a as shown in FIG. 5. In this case, the board 515 does not intercept the light of the laser beam 501. Thus, the laser beam 501 is emitted to the pair of the cylindrical lenses 57, with the laser diameter being D. This means that the diameter of the beam spot corresponding to the laser beam 501 that is incident on the surface of the photosensitive drum is B.

Next, suppose that the board 515 comes in contact with the stopper 517b. In this case, the board 515 intercepts the light of the laser beam 501 except for the center part, as shown in FIG. 7B. The diameter of the laser beam 501 becomes D' that is smaller than D, so that the diameter of the beam spot corresponding to the laser beam 501 that is incident on the surface of the photosensitive drum is one-third of B.

(2) Control of the Skip Scanning

Figure 8:
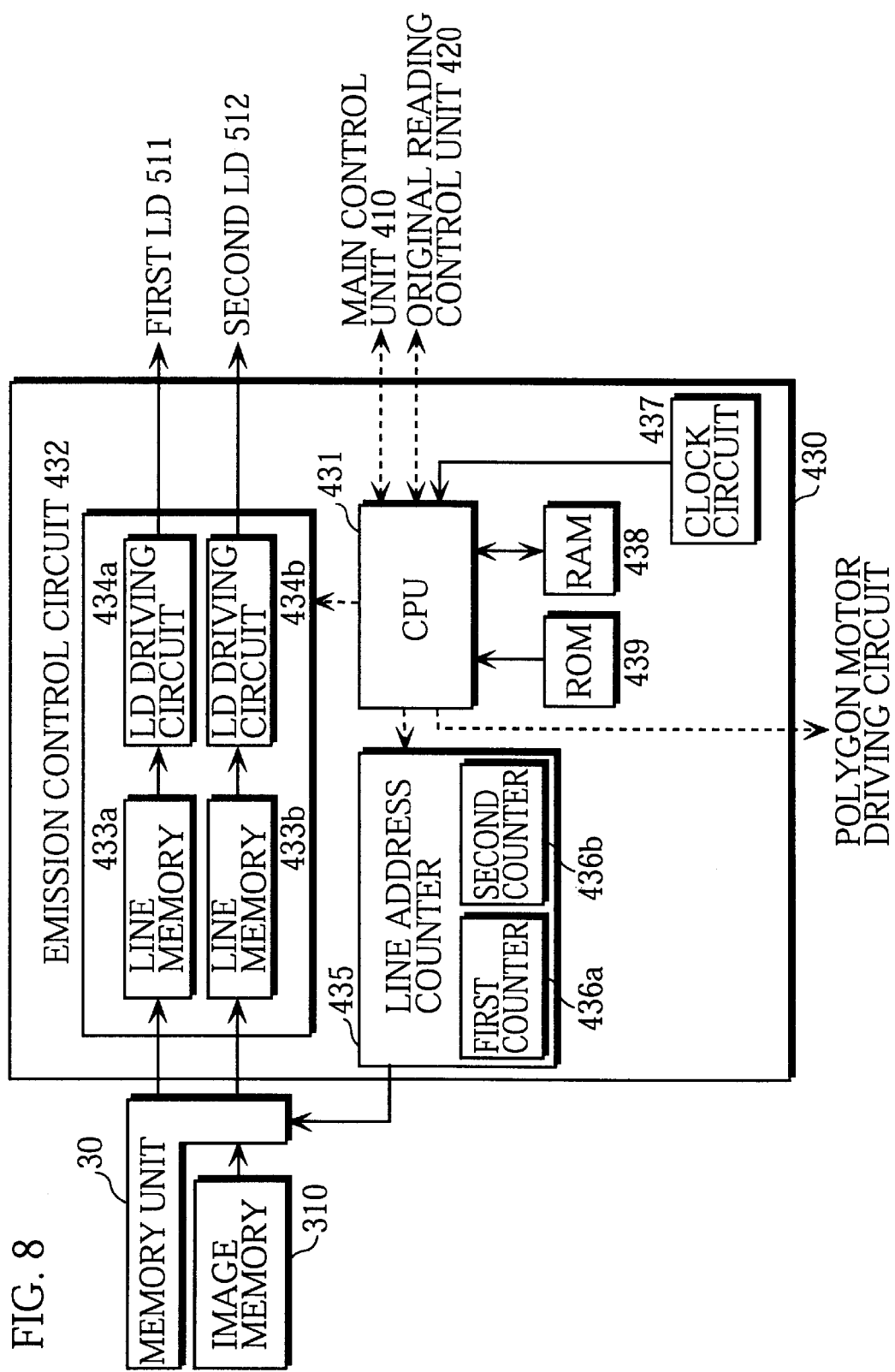
FIG. 8 is a block diagram showing the structure of an optical system control unit included in the control unit.

The optical system control unit 430 controls the skip scanning. FIG. 8 shows the structure of the optical system control unit 430.

The optical system control unit 430 is composed of a CPU 431, an emission control circuit 432, a line address counter 435, a clock circuit 437, a RAM 438, and a ROM 439.

The emission control circuit 432 receives two lines of line data from the image memory 310 and temporarily stores the line data respectively into line memories 433a and 433b. The emission control circuit 432 converts the two lines of the line data into the LD driving signals using LD driving circuits 434a and 434b, and transmits the LD driving signals to the first and second LDs 511 and 512 respectively. In doing so, the emission control circuit 432 controls timings to transmit the LD driving signals for the purposes of aligning the scanning start positions in the main scanning direction on the photosensitive drum 61 and of keeping the scanning pitch constant.

Receiving resolution information from the main control unit 410 regarding which resolution (400 dpi or 1200 dpi) is specified by the user, the CPU 431 notifies the line address counter 435 of the resolution information. Then, the CPU 431 has a polygon motor (not shown) of the polygon mirror 52 rotate at a rotational speed that corresponds to the specified resolution.

The CPU 431 also controls a timing at which the laser beams 501 and 502 are incident upon the photosensitive drum 61 for each scanning process. By doing so, in a series of scanning processes, the scanning start positions are aligned in the main scanning direction. The CPU 431 achieves this control operation according to the well-known technique called "SOS (Start of Scan) detection," and the explanation of this technique is omitted in the present embodiment.

The clock circuit 437 generates a clock signal to be used by the CPU 431 as the reference for controlling the timings. Out of information required for controls performed by the CPU 431, the ROM 439 stores fixed information, such as programs for control processes, while the RAM 438 stores information that is to be changed.

The line address counter 435 designates line data to be used for a scanning process by line addresses (corresponding to scanning line numbers) and has the line data outputted from the memory unit 30. The operation of the line address counter 435 is specifically explained. The line address counter 435 holds two line addresses of the line data to be read from the image data memory 310 for a scanning process. On receiving an instruction from the CPU 431, the line address counter 435 notifies the memory unit 30 of the line addresses. As understood from the drawings shown in FIGS. 4A and 4B, the address of the line data read for the scanning process is changed according to the specified resolution. Since two laser beams are used for each scanning process in the copier 1, the line address counter 435 needs to separately count the addresses of the line data corresponding to the two laser beams. For this reason, the line address counter 435 includes a first counter 436a for the laser beam 501 and a second counter 436b for the laser beam 502.

In the $N^{th}$ scanning process, line addresses (or, scanning line numbers) of the line data which the line address counter 435 requests the memory unit 30 to output are: (2N−1) and 2N when the specified resolution is 400 dpi; and (2N−3) and 2N when the specified resolution is 1200 dpi. Consequently, in accordance with the specified resolution, the scanning lines are scanned in the respective orders as shown in FIGS. 4A and 4B.

Prior to the series of scanning processes for the image formation, the CPU 431 resets the first and second counters 436a and 436b. When 400 dpi is specified, the value of the first counter 436a is reset to "−1" and the value of the second counter 436b is reset to "0". Meanwhile, when 1200 dpi is specified, the value of the first counter 436a is reset to "−3" and the value of the second counter 436b is reset to "0".

Every time the first and second counters 436a and 436b receive a request for the line data from the CPU 431 in synchronization with an SOS signal, the first and second counters 436a and 436b respectively output the values of the line addresses to the memory unit 30 for each scanning process. In doing so, the first and second counters 436a and 436b add "2" to the count values since two lines are scanned for each scanning process.

When the specified resolution is 1200 dpi, the LD driving signals for the line data associated with the $(2N−3)^{th}$ and $2N^{th}$ scanning lines are respectively transmitted to the first and second LDs 511 and 512. However, in the first scanning process, the line data to be outputted for the LD 511 does not exist since a result of the calculation (2N−3) is "−1". In this case, the memory unit 30 outputs null-valued data to the LD 511 and, as a result, the laser beam 501 is not emitted. Thus, only the LD 512 emits the laser beam 502 for the scanning line numbered "2".

In the last scanning process, the value of 2N or the values of 2N and (2N−1) may exceed the actual total number of lines of image data. In this case, the memory unit 30 also outputs null-valued data since the corresponding line data does not exist.

(3) Control of the Scanning Speed

When the resolution is switched from 400 dpi to 1200 dpi as shown in FIGS. 4A and 4B, the scanning pitch is also changed from 403a to 403b, in addition to the changes of the beam diameter (from 401a to 401b) and the order in which the scanning lines are scanned. As described above, when the resolution is tripled, the total number of scanning lines is also tripled and, therefore, the scanning pitch needs to be reduced to one-third.

In the present embodiment, when 1200 dpi is specified, the scanning pitch is reduced to one-third by tripling the scanning speed of the laser beams.

The scanning speed is determined by the rotational speed of the polygon mirror 52. The rotational speed of the polygon mirror 52 can be easily changed by adjusting the number of rotations of the polygon motor. The number of rotations of the polygon motor is in turn adjusted using a polygon motor control signal transmitted from the CPU 431.

In accordance with the changed scanning speed (this is to say, a period of time taken for one scanning process is changed), the outputting speed of line data for one scanning line needs to be accordingly changed. Here, this outputting speed refers to the output clock frequency. In the case of 1200 dpi, the period of time taken for one scanning process is reduced to one-third, and the number of pixels per one scanning line is tripled due to the tripled resolution. As such, the outputting speed of line data (i.e. the number of pixels outputted per unit of time) from the memory unit 30 needs to be increased nine times faster. In other words, the output clock frequency needs to be increased nine times greater than a case where the resolution of 400 dpi is specified.

Accordingly, by changing the laser diameter, executing the skip scanning, and changing the scanning pitch, the series of scanning processes can be performed at the resolution of 1200 dpi as shown in FIG. 4B.

Operation of the Control Unit 40

Figure 9:
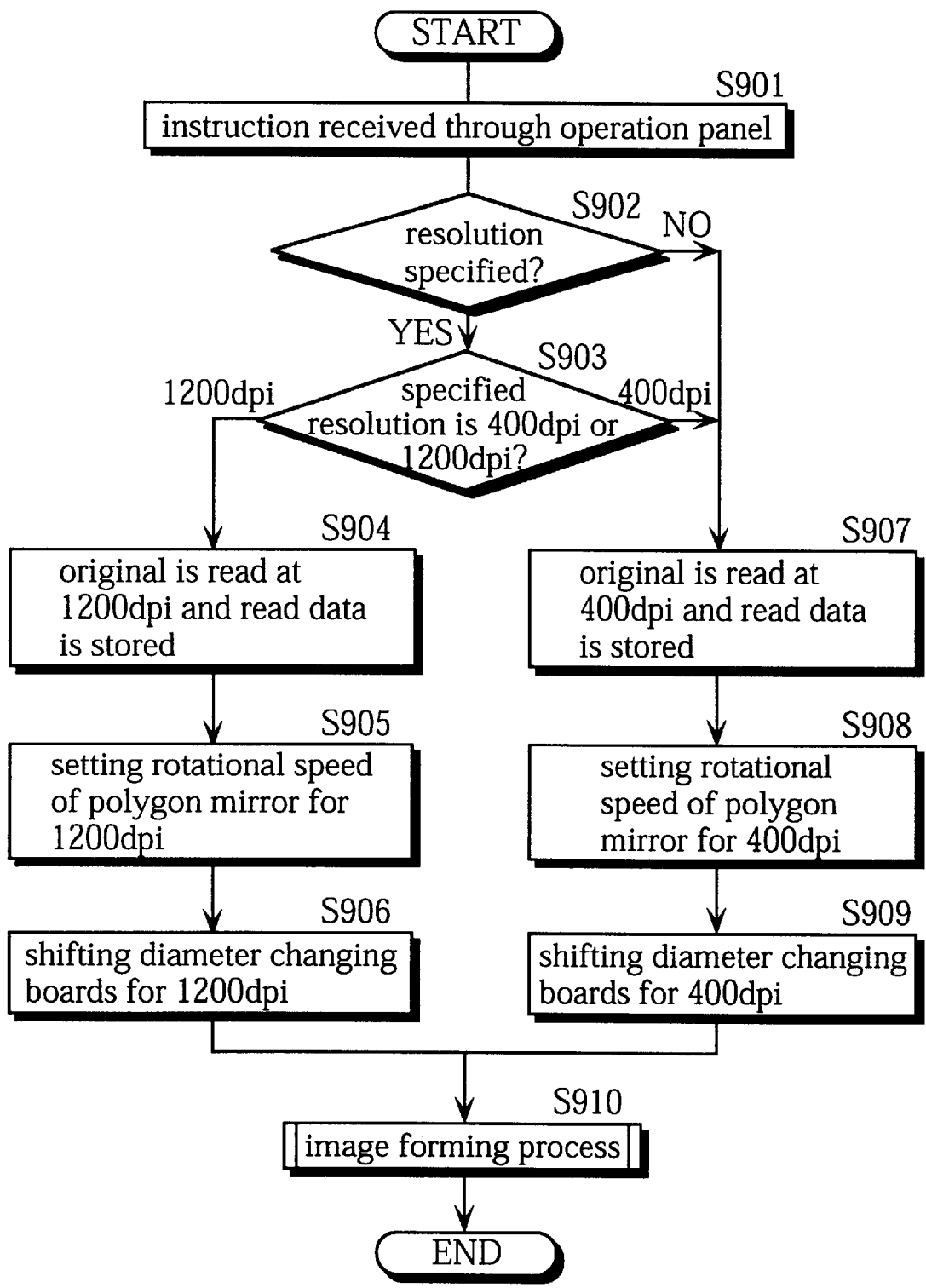
FIG. 9 is a flowchart of a process performed by the control unit in relation to a resolution switch.

The following is a description of the control process performed by the control unit 40 for a resolution switch when the image formation is to be executed. FIG. 9 is a flowchart of this control process.

First, the main control unit 410 receives an instruction from the user through the operation panel (step S901). When the user specifies the resolution ("YES" in step S902), the main control unit 410 judged the specified resolution (step S903). If the user is judged to specify 1200 dpi ("1200 dpi" in step S903), the main control unit 410 notifies the original reading control unit 420 and the optical system control unit 430 that the specified resolution is 1200 dpi.

The original reading control unit 420 then sets the output clock frequency and the scanning speed for 1200 dpi, and controls the image reading unit 10 to read image data of the original at the resolution of 1200 dpi. After the image signal processing unit 20 performs the necessary correction processes on the read image data, the read image data is stored in the memory unit 31. These processes described in this paragraph are performed in step S904.

The optical system control unit 430 sets the rotational speed of the polygon mirror 52 for 1200 dpi (step S905), and has the boards 515 and 516 shifted as shown in FIG. 7B (step S906).

Meanwhile, when the user does not specify the resolution ("NO" in step S902) or the resolution specified by the user is 400 dpi ("400 dpi" in step S903), the main control unit 410 notifies the original reading control unit 420 and the optical system control unit 430 that the resolution to be used is 400 dpi.

The original reading control unit 420 then sets the output clock frequency and the scanning speed for 400 dpi, and controls the image reading unit 10 to reed image data of the original at the resolution of 400 dpi. After the image signal processing unit 20 performs the necessary correction processes on the read image data, the read image data is stored in the memory unit 31. These processes described in this paragraph are performed in step S907.

The optical system control unit 430 sets the rotational speed of the polygon mirror 52 for 400 dpi (step S908), and has the boards 515 and 516 shifted as shown in FIG. 7A (step S909).

After these steps, the main control unit 410 executes the control processes for image formation (step S910).

Operation of the Optical System Control Unit 430

Figure 10:
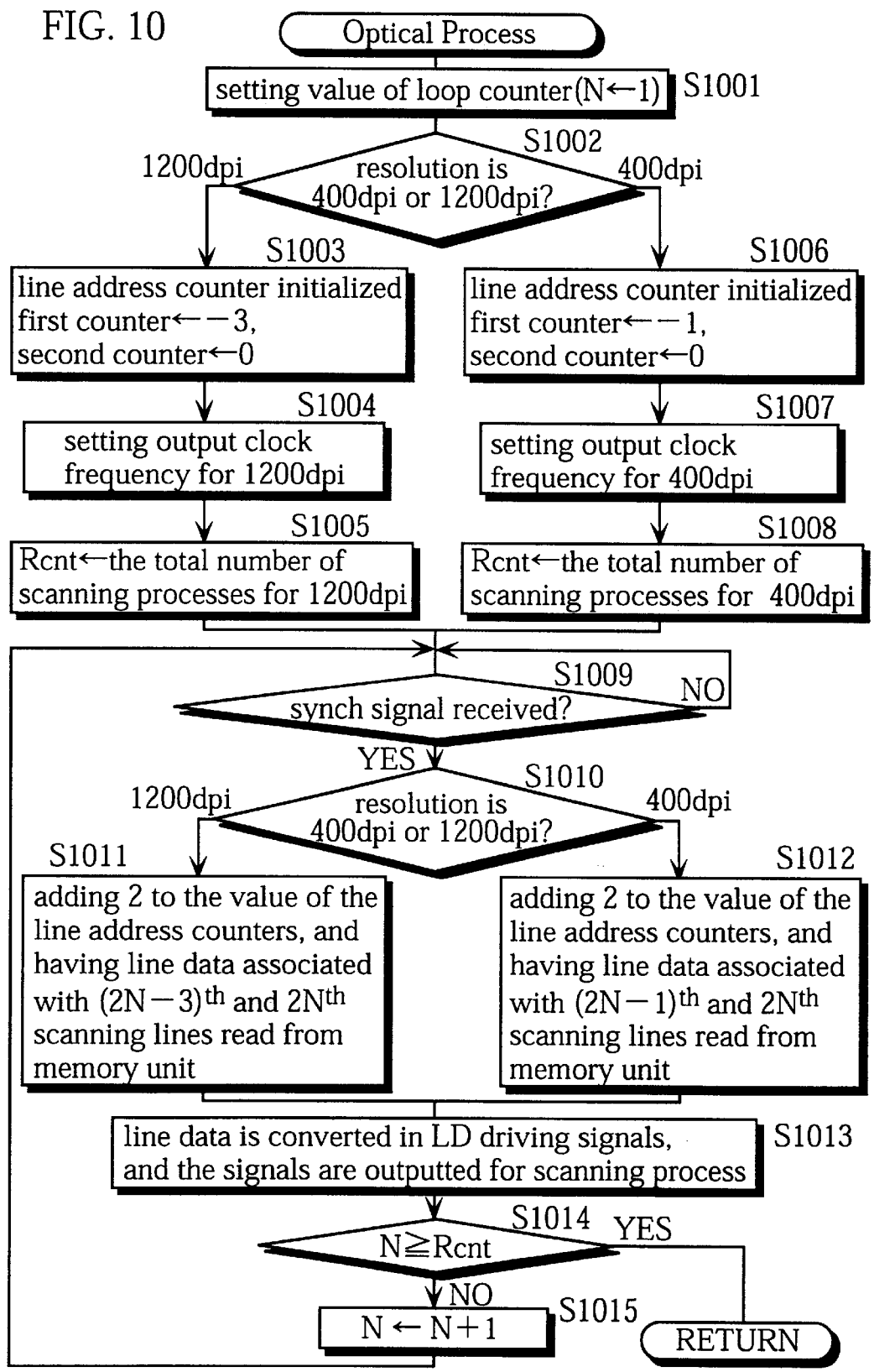
FIG. 10 is a flowchart of a process performed by the optical system control unit in relation to a resolution switch.

The following is a description of the operation performed by the optical system control unit 430 when the image formation is to be executed. FIG. 10 is a flowchart of an optical process included in the image formation process of step S910 of the flowchart shown in FIG. 9. The optical process is controlled by the optical system control unit 430.

Receiving an instruction from the main control unit 410, the CPU 431 initializes the counters to be used in this process. First, the CPU 431 sets a value of a loop counter provided in the RAM 438 to "1" (step S1001). The loop counter counts the number of scanning processes and so indicates the number of the current scanning process. Then, according to the specified resolution (step S1002), the CPU 431 sets the respective initial values to the first and second counters 436a and 436b provided in the line address counter 434 (step S1003 or S1006).

The CPU 431 notifies the memory unit 30 of the resolution information, and has the memory unit 30 set the output clock frequency in accordance with the specified resolution (step S1004 or S1007). As described above, the output clock frequency is employed when the image data is outputted from the memory unit 30.

The CPU 431 receives information regarding the number of lines of data stored in the image memory 310 from the memory unit 30. This number is equivalent to the number of scanning lines. Based on this information, the CPU 431 sets the total number of scanning processes (the number indicating how many times the scanning process should be repeated) to Rcnt in the RAM 438 in accordance with the specified resolution (step S1005 or S1008). As one example, suppose that the specified resolution is 400 dpi and that the number of scanning lines is 2L. In this case, Rcnt is obtained as L by calculating (2L÷2) in the case of 400 dpi, and is obtained as (3L+1) by calculating ((3×2L)÷2+1) in the case of 1200 dpi.

After this, the CPU 431 waits for the synch signal to be outputted from an SOS sensor. On receiving the synch signal ("YES" in step S1009), the CPU 431 outputs an instruction signal to the line address counter 435. The line address counter 435 then requests the memory unit 30 to output the corresponding line data. In doing so, the line address counter 435 notifies the memory unit 30 of the values as the line addresses after adding "2" to the values of the first and second counters 436a and 436b. When the specified resolutionis 400 dpi in step S1010, the line addresses to be notified are (2N−1) and 2N (step S1012). When the specified resolution is 1200 dpi in step S1010, the line addresses to be notified are (2N−3) and 2N (step S1011).

The two lines of image data is outputted by one pixel at a time at the output clock frequency corresponding to the specified resolution. The image data associated with the two lines is converted into the LD driving signals by the LD driving circuit 432, and then the laser beams 501 and 502 are emitted in synchronization with each other (step S1013).

The CPU 431 then compares the value N of the loop counter with the number Rcnt. If the value N is equal to or more than the number Rcnt ("YES" in step S1014), the CPU 431 terminates this process and returns to the flowchart of FIG. 9. If the value N is less than the number Rcnt ("NO" in step S1014), the CPU 431 adds "1" to the value N (step S1015) and repeats the processes from steps S1009 to S1014.

In the present embodiment, by changing the beam diameter, executing the skip scanning, and changing the scanning speed (i.e. reducing the scanning pitch to one-third), the resolution can be changed from 400 dpi to 1200 dpi. Therefore, unlike a conventional apparatus, the apparatus of the present invention does not require special hardware constructions, s,such as a device with high precision for changing a distance between the centers of two beams or a plurality of light source devices. Accordingly, by means of the present invention, the resolution can be efficiently switched at a low cost.

Although the boards 515 and 516 are used for changing the laser diameter in the present embodiment, other methods may be employed. For example, the amount of light emitted from a light source or a developing bias voltage may be changed in accordance with the resolution, so that the laser diameter is accordingly changed. Alternatively, a diameter-changeable laser may be used as a light source as disclosed in Japanese Laid-Open Patent Application No. 07-89131.

Although the number of laser beams emitted in one scanning process is two in the present embodiment, this number is not limited to two and may be more than two. However, when the number of laser beams is three or more, it is practical to change the amount of light or the developing bias voltage, or to use the diameter-changeable laser as described above for changing the beam diameter instead of providing the boards as in the present embodiment.

In the present embodiment, when the resolution of 1200 dpi is specified, the image data is read and stored in the memory unit 30 in the order in which it is read. As such, the order in which the line data is read for modulating the laser beams is controlled by a program. However, the order in which the read image data is written into the memory unit 30 may be changed in advance when the resolution of 1200 dpi is specified. More specifically, the read image data may be first stored into a buffer memory in the order in which it is read, and then the order in which the image data associated with the lines is stored into the memory unit 30 may be changed. When a series of scanning processes is to be executed in this case, two lines of the line data may be read for each scanning process from the memory unit 30 in the order in which the line data is stored so that the laser beams can be modulated regardless of the specified resolution.

Moreover, the order in which the line data is outputted can be controlled by adding a hardware construction. As one example, for a case where 1200 dpi is specified, four line memories may be provided. Four lines of line data may be read from the memory unit 30, each line data being stored in a different line memory. These four line memories may be controlled by a switching circuit. The switching circuit may obtain each line address of the line data stored in the line memories from the memory unit 30. The switching circuit may receives a notification of line addresses ($(2N-3)^{th}$ and $2N^{th}$) associated with the line data to be outputted for a scanning process from a line address counter. In accordance with the notification, the switching circuit may determines two line memories that store the line data associated with the $(2N-3)^{th}$ and $2N^{th}$ lines. Then, the switching circuit may instruct the two line memories to output the line data to the LD driving circuit. After this, the switching circuit may instruct the memory unit 30 to have the two line memories that have just outputted the line data store the next line data.

In the present embodiment, a digital copier is used as an example of a multi-beam image recording apparatus of the present invention. However, the present invention can be applied to any apparatus, such as a laser printer, that records an image using two or more laser beams.

For example, suppose that the present invention is applied to a laser printer. Image formation is performed using image data outputted from an external terminal. In this case, data indicating the resolution may be attached at the start of the image data so that the laser printer can read the attached data. By doing so, the resolution can be automatically switched and the user does not take the trouble to specify the resolution through the operation panel.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An image recording apparatus which records an image by scanning a plurality of optical beams across an image carrier, the image recording apparatus comprising:
   a storing unit which holds image data to be recorded, as a plurality of sets of line data;
   a receiving unit which receives resolution data that indicates a resolution of the image data to be recorded;
   a reading unit which reads sets of line data from the storing unit, the sets of line data being determined according to the received resolution data;
   a plurality of light emitters which respectively emit optical beams, each optical beam being modulated with a different set of line data read by the reading unit;
   a main-direction scanning unit which simultaneously scans the optical beams in a main scanning direction, the optical beams being separated from each other on a surface of the image carrier in a sub-scanning direction that is perpendicular to the main scanning direction;
   a diameter changing unit which changes, in accordance with the resolution data, a diameter of a spot formed by each optical beam on the surface of the image carrier, without changing a distance between the optical beams; and
   a pitch changing unit which changes, in accordance with the resolution data, a pitch between main-scanning lines on the image carrier in the sub-scanning direction, each main-scanning line being a path of an optical beam that is scanned on the image carrier in the main scanning direction by the main-direction scanning unit.

2. The image recording apparatus of claim 1,
   wherein the pitch changing unit includes a speed changing unit which changes a scanning speed of the main-direction scanning unit in accordance with the resolution data.

3. The image recording apparatus of claim 2,
   wherein the main-direction scanning unit is a polygon mirror that is driven by a polygon motor,
   wherein the speed changing unit is a circuit that changes a rotational speed of the polygon motor in accordance with the resolution data.

4. The image recording apparatus of claim 1 further comprising
   an image reading unit which reads a document image at a resolution indicated by the resolution data and stores the read document image into the storing unit.

5. The image recording apparatus of claim 1,
   wherein when a first resolution is specified, the reading unit reads consecutive sets of line data from the storing unit, the number of the sets being equal to the number of the optical beams,
   wherein when a second resolution is specified, the reading unit reads non-consecutive sets of line data from the storing unit under a predetermined rule, the number of the sets being equal to the number of the optical beams.

6. The image recording apparatus of claim 5,
   wherein when the resolution data indicates that a specified resolution is N times greater than a current resolution, the diameter changing unit reduces the diameter to 1/N, N being a positive integer.

7. The image recording apparatus of claim 6,
   wherein when the current resolution is the first resolution and the resolution data indicates that the specified resolution is N times greater than the first resolution, the reading unit reads sets of line data from the storing unit corresponding to the number of the optical beams, the sets of line data being N lines apart.

8. The image recording apparatus of claim 1,
   wherein the diameter changing unit includes:
     a member which has a window, a diameter of the window being smaller than a diameter of each optical beam; and
     a member shifting unit which withdraws the member from a beam path from the light emitters to the main-direction scanning unit when the first resolution is specified, and sets the member on the beam path when the second resolution is specified.

9. An image recording apparatus which records an image by scanning a plurality of optical beams across an image carrier, the image recording apparatus comprising:
   a storing unit which holds image data to be recorded, as a plurality of sets of line data;
   a receiving unit which receives resolution data that indicates a resolution of the image data to be recorded;
   a reading unit which reads sets of line data from the storing unit;
   a plurality of light emitters which respectively emit optical beams, each optical beam being modulated with a different set of line data read by the reading unit;
   a main-direction scanning unit which simultaneously scans the optical beams in a main scanning direction, the optical beams being separated from each other on a surface of the image carrier in a sub-scanning direction that is perpendicular to the main scanning direction; and
   a diameter changing unit which changes, in accordance with the resolution data, a diameter of a spot formed by each optical beam on the surface of the image carrier, without changing a distance between the optical beams.

10. An image recording apparatus which records an image by scanning a plurality of optical beams across an image carrier, the image recording apparatus comprising:
    a storing unit which holds image data to be recorded, as a plurality of sets of line data;
    a receiving unit which receives resolution data that indicates a resolution of the image data to be recorded;
    a reading unit which reads sets of line data from the storing unit, the sets of line data being determined according to the received resolution data;

a plurality of light emitters which respectively emit optical beams, each optical beam being modulated with a different set of line data read by the reading unit; and a main-direction scanning unit which simultaneously scans the optical beams in a main scanning direction, the optical beams being separated from each other on a surface of the image carrier in a sub-scanning direction that is perpendicular to the main scanning direction.

11. An image recording method of recording an image by scanning a plurality of optical beams across an image carrier, the image recording method comprising:

a step of storing image data to be recorded, as a plurality of sets of line data;

a step of receiving resolution data that indicates a resolution of the image data to be recorded;

a step of reading sets of line data from the storing unit, the sets of line data being determined according to the received resolution data;

a step of emitting a plurality of optical beams, each optical beam being modulated with a different set of line data read in the reading step;

a step of changing, in accordance with the resolution data, a diameter of a spot formed by each optical beam on the surface of the image carrier, without changing a distance between the optical beams;

a step of simultaneously scanning the optical beams in a main scanning direction, the optical beams being separated from each other on a surface of the image carrier in a sub-scanning direction that is perpendicular to the main scanning direction; and a step of changing, in accordance with the resolution data, a pitch between main-scanning lines on the image carrier in the sub-scanning direction, each main-scanning line being a path of an optical beam that is scanned on the image carrier in the main scanning direction by the scanning step.

12. An image recording method of recording an image by scanning a plurality of optical beams across an image carrier, the image recording method comprising:

a step of storing image data to be recorded, as a plurality of sets of line data;

a step of receiving resolution data that indicates a resolution of the image data to be recorded;

a step of reading sets of line data from the storing unit;

a step of emitting a plurality of optical beams, each optical beam being modulated with a different set of line data read in the reading step;

a step of changing, in accordance with the resolution data, a diameter of a spot formed by each optical beam on the surface of the image carrier, without changing a distance between the optical beams; and a step of simultaneously scanning the optical beams in a main scanning direction, the optical beams being separated from each other on a surface of the image carrier in a sub-scanning direction that is perpendicular to the main scanning direction.

13. An image recording method of recording an image by scanning a plurality of optical beams across an image carrier, the image recording method comprising:

a step of storing image data to be recorded, as a plurality of sets of line data;

a step of receiving resolution data that indicates a resolution of the image data to be recorded;

a step of reading sets of line data from the storing unit, the sets of line data being determined according to the received resolution data;

a step of emitting a plurality of optical beams, each optical beam being modulated with a different set of line data read in the reading step; and a step of simultaneously scanning the optical beams in a main scanning direction, the optical beams being separated from each other on a surface of the image carrier in a sub-scanning direction that is perpendicular to the main scanning direction.

14. An image recording apparatus which records an image by scanning a plurality of optical beams across an image carrier, the image recording apparatus comprising:

a storing unit which holds image data to be recorded, as a plurality of sets of line data;

a receiving unit which receives resolution data that indicates a resolution of the image data to be recorded;

a selecting unit which selects sets of line data among said plurality of sets of line data stored in said storing unit according to the resolution data received by said receiving unit;

a reading unit which reads sets of the line data selected by said selecting unit from the storing unit;

a plurality of light emitters which respectively emit optical beams, each optical beam being modulated with a different set of line data read by the reading unit; and a main-direction scanning unit which simultaneously scans the optical beams in a main scanning direction, the optical beams being separated from each other on a surface of the image carrier in a sub-scanning direction that is perpendicular to the main scanning direction.

15. An image recording method of recording an image by scanning a plurality of optical beams across an image carrier, the image recording medium comprising:

a step of storing image data to be recorded in a storing unit, as a plurality of sets of line data;

a step of receiving resolution data that indicates a resolution of the image data to be recorded;

a step of selecting sets of line data among said plurality of sets of line data stored in the storing unit according to the resolutions data received by said receiving unit;

a step of reading sets of line data selected in the selecting step from the storing unit;

a step of emitting a plurality of optical beams, each optical beam being modulated with a different set of line data read in the reading step; and a step of simultaneously scanning the optical beams in a main scanning direction, the optical beams being separated from each other on a surface of the image carrier in a sub-scanning direction that is perpendicular to the main scanning direction.

* * * * *